United States Patent Office 2,784,322
Patented Mar. 5, 1957

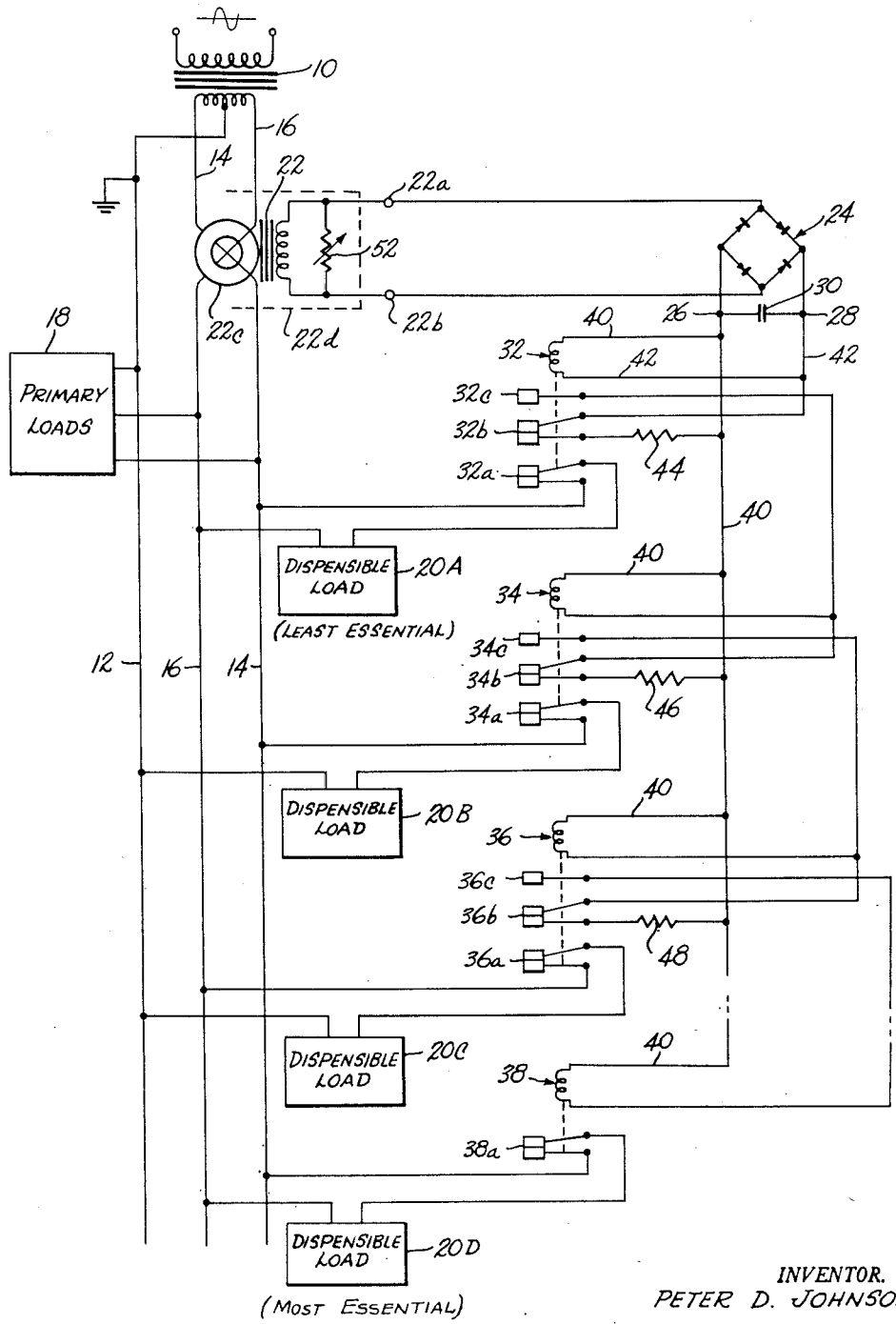

2,784,322

ELECTRIC POWER DEMAND CONTROLLERS

Peter D. Johnson, Seattle, Wash., assignor, by mesne assignments, to Iron Fireman Manufacturing Co., Portland, Oreg., a corporation of Oregon Application November 17, 1955, Serial No. 547,361

9 Claims. (Cl. 307—39)

This invention relates to improved apparatus for controlling the electric power demand imposed by a system of loads on an electric energy source. More specifically the invention concerns improvements in demand limiting apparatus of the type by which different load units are disconnected from the energy source in predetermined successive order automatically in response to recurrences of total load exceeding a predetermined upper limit and are reconnected to the energy source in the reverse order automatically in response to recurrences of total load dropping below a predetermined lower limit. The invention is herein illustratively described by reference to the presently preferred form thereof; however, it will be recognized that certain modifications and changes therein may be made without departing from the essential and characterizing features involved.

It is well known that electric utility company rate structures necessarily favor the consumer whose peak load current requirements are not greater than a predetermined value in relation to the average load demand of the premises. Efforts have therefore been made heretofore to provide apparatus of the general type mentioned above which would disconnect non-essential or temporarily dispensible loads from the electric power lines as necessary to avoid exceeding the peak demand value selected for the particular premises. Any indispensible load units in the premises are not disturbed, and those temporarily dispensible load units which are subject to isolation from the power system by the control apparatus are disconnected in the decreasing order of their relative dispensibility in no greater numbers than necessary and for no longer than necessary to avoid peak demand excesses.

An important object of this present invention is apparatus of the described type which is relatively safe, reliable and inexpensive to manufacture and install. A related object is such apparatus which requires only readily available or standard components, which may be constructed in highly compact form and which presents no serious maintenance problems.

Another object is such apparatus which is not critical of adjustment nor subject to instabilities of operation, and which may be readily adjusted to operate in different systems wherein the load units differ widely in their load demand.

A highly important object is such demand control apparatus in the operation of which variation in the number of load-sensitive disconnect switch actuators instantaneously energized has no appreciable effect on the upper and lower values of total load current to which the apparatus responds for subtracting or adding load units. Thus the improved apparatus avoids changes in sensitivity to total load which customarily occur in systems wherein variations in the effective current-to-voltage transformation ratio of a total-load-sensing current transformer are caused by variations in the number of load disconnect switches instantaneously actuated in the operation of such systems. Further, the novel apparatus is capable of operating reliably and in consistent manner as aforesaid with a standard type of current transformer having a shunted output which thereby eliminates the possibility otherwise of developing dangerously high transformer output voltages in the event of a break in the connection to remotely situated load demand control actuators. As a result the apparatus becomes classifiable as low-voltage equipment according to the standards of fire codes and underwriters' specifications.

As herein disclosed the invention employs a series of relays selectively energizable to actuate the respective switch means normally connecting the temporarily dispensible load units to the power distribution conductors of the utility company. The relay associated with the most dispensible load unit remains continuously connected to the output of a total-load-current sensing transformer, whereas those respectively associated with successively less dispensible load units are successively and cumulatively connected to such output by individual switch means actuated by the respective relays associated with the next most dispensible load units in the series. In accordance with an important feature of the invention energization of the successively energizable relays also actuates still other sets of contacts associated therewith for connecting across the current transformer output circuit different values of compensating resistance such as will combine with the resistances of the energized relays to maintain a substantially constant net load resistance across the current transformer output regardless of variations in the number of relays instantaneously energized. Another important feature of the apparatus is the provision of shunt resistance means connected directly across the current transformer terminals within or effectively as a part of such transformer to prevent excessive voltage rises therein should there be a break in the transformer output conductors. In accordance with still another feature, said resistance means is made variable as a means of changing the operating difference between the upper and lower total load limits to which the apparatus is responsive, in order to suit the peak load demand requirements of different installations without need of making any other apparatus changes or adjustments.

These and other features, objects and advantages of the invention will become more fully evident from the following description thereof by reference to the accompanying drawing constituting a schematic circuit diagram of the novel control apparatus in its presently preferred form.

Referring to the drawing, the power supply system is represented in the illustrated application of the invention as a three-wire distribution network comprising the distribution transformer 10, the secondary of which is connected to the three-wire distribution line of the local premises being served and for which peak power demand control is desired. The transformer secondary has a grounded mid-tap connected to the ground conductor 12. Opposite ends of the winding are connected to the respective power conductors 14 and 16 from which the required branch connections are extended to the different loads to be served, as shown. In a typical domestic installation, the described arrangement would represent a 220-volt three-wire supply, capable of servicing loads rated at either 220 volts or 110 volts. A number of the individual loads to be serviced in most installations are regarded as indispensible. These are designated as primary loads 18 in the circuit diagram, and constitute loads for which energizing power must always be available. In a domestic installation, typical examples of indispensible loads are electric ranges, electric clocks, radios, television sets, etc. In the same premises are other loads which may be treated as being of a temporarily dispensible nature, and which may be assigned a relative degree of dispensibility. In the diagram, four such loads are shown, being designated 20A, 20B, 20C and 20D, named in order of decreasing dispensibility. Examples of temporarily dispensible loads in a domestic installation might include electric hot water heaters, electric space heaters or sections of a space heater system, etc. It will be recognized that the dispensible loads are those which can be temporarily disconnected from the power distribution conductors 12, 14 and 16 for any temporary periods during which their connection to the power system would cause a total load current or system demand in excess of the demand rating of the premises upon which the power utility company bases its charges for electric energy consumption.

In order to sense the total load current flowing through the distribution transformer 10 to the loads in the consumer premises, a current-sensing means in the nature of the current transformer 20 is coupled to the power distribution conductors 14 and 16 in such a way that an output voltage is developed across the transformer output terminal 22a and 22b which is proportional to total load current. The conventional technique in a three-wire line for yielding such a result is to link the current transformer ferromagnetic core 22c with the two non-grounded conductors 14 and 16 for additive induction in such windings from current flow in both conductors as shown schematically in the circuit diagram. The resulting alternating voltage appearing across terminals 22a and 22b may be used directly as A. C. control relay energizing voltage, however it is preferably first converted into direct voltage by application to the rectifier bridge 24 to produce a D. C. control voltage across output terminals 26 and 28 shunted by the filter condenser 30. The current transformer 22, rectifier bridge 24 and filter condenser 30 comprise a total load current sensing means used to operate the control switching apparatus for automatically limiting the system demand by switching the dispensible loads in and out of the energy consuming system as required.

Associated with the dispensible loads 20A, 20B, 20C and 20D are the control relays 32, 34, 36 and 38, respectively. Each of these relays has a normally closed set of contacts, designated 32a, 34a, 36a and 38a, respectively, which connect the associated dispensible loads 20A, 20B, 20C and 20D to the power distribution conductors for energization of such loads in accordance with the manual or automatic on and off operation thereof. In addition, all but the last of these control relays have a second set of normally closed contacts, being designated 32b, 34b, and 36b respectively. Further, these same relays also have a set of normally open contacts, and these are designated 32c, 34c and 36c, respectively.

In the preferred and usual application of the invention, each of the relays is energizable by applied voltage which exceeds a predetermined upper value of output voltage appearing across terminals 26 and 28, corresponding to a predetermined upper or peak total load current delivered through the distribution conductors 12, 14 and 16. Likewise, each relay is deenergizable in response to applied voltage below a predetermined lower value of control voltage appearing across conductors 26 and 28 corresponding to a predetermined lower value of total load current delivered by such distribution conductors. Energization of any relay produces actuation of its contacts into the positions opposite from those shown in the diagram, while deenergization thereof produces a return of its contacts to their illustrated normal position.

Relay 32 is continuously connected by conductors 40 and 42 across the sensing means output terminals 26 and 28. Conductor 40 is connected to one side of each of the other relays. The opposite side of relay 34 is connectable to the other energizing conductor 42 through relay contacts 32c in closed position. The other side of relay 36 is connectable to energizing conductor 42 through relay contacts 34c and 32c serially in their closed position. The other side of relay 38 is connectable to energizing conductor 42 through relay contacts 36c, 34c and 32c serially in their closed position. Thus, energization of relay 32 connects relay 34 across the output terminals 26 and 28, simultaneous energization of relays 32 and 34 connects relay 36 across terminals 26 and 28, and simultaneous energization of relays 32, 34 and 36 connects relay 38 across the same output terminals.

The normally closed relay contacts 32b connect a first compensating resistance 44 in parallel with relay 32 across the sensing means output terminals 26 and 28. The normally closed relay contacts 34b similarly connect a second compensating resistance element 46 in parallel with the relay 34, hence across the sensing means output when the latter relay is connected thereacross by energization of relay 32. Similarly, normally closed relay contacts 36 normally connect a third compensating resistance element 48 in parallel with the relay 36, hence across the sensing means output when the latter relay is connected thereacross. In the specific example, the fourth relay does not require such a resistance element, for a reason which will be explained.

The function of the different compensating resistance elements is to permit variations in the number of control relays instantaneously being energized in parallel relationship by the total load sensing means while maintaining a substantially constant net total resistance across the output terminals of the total load current sensing means. This important feature of the control apparatus insures that the variation in numbers of control relays simultaneously drawing current from the sensing means will in no way affect the sensitivity of the apparatus to variations of total load current in the consumer premises and, more especially, the ability of such apparatus to accurately detect and respond to the condition of total load current drawn in excess of the particular value of peak demand limit assigned to the system. The different values of resistance for these compensating resistances may be calculated readily by first selecting the desired value of total resistance to be maintained across sensing means output terminals 26 and 28. To provide this load resistance across the sensing means output with only relay 32 connected thereacross, the reciprocal of resistance of this relay is added to the reciprocal of the first unknown resistance 44 and equated to the reciprocal of the desired output load resistance, and the equation solved. The same procedure is followed in the case of each of resistances 46 and 48, noting that in each of these instances one side of the equation must include the sum of the reciprocals of resistances of the number of relays then simultaneously connected across the sensing means output. There may or may not be a compensating resistance element required in the case of the last relay in the series. None is shown in the diagram because of the particular selection of resistance values in the example as described below.

A specific example of typical values for the compensating resistance is as follows: Assume that each of the four relays 32, 34, 36 and 38 have the same electrical resistance, 200 ohms. Let it also be assumed that a suitable load resistance across the sensing means output is 50 ohms. This latter value of load resistance is achieved when only relay 32 is connected across terminals 26 and 28 by selecting a value of 66 ohms for resistance element 44. When relay 32 is energized and relay 34 with its resistance element 46 are connected in parallel with relay 32 across the output of the sensing means, resistance element 44 is disconnected therefrom. In this case, the desired 50 ohms net resistance across output terminals 26 and 28 is achieved if resistance element 46 is 100 ohms. By similar analysis, it is obvious that resistance element 48 should be 200 ohms since this will yield a combined net resistance of 50 ohms when this resistance element is connected in parallel with the first three relays across terminals 26 and 28. By similar reasoning, it is evident that no resistance element in parallel with the last relay 38 is necessary in the example to achieve 50 ohms load across terminals 26 and 28 when all relays are energized.

The foregoing important feature of utilizing compensating resistance elements for maintaining substantially constant loading on the sensing means output enables directly the obtaining of another important advantage. For example, a variable impedance in the form of resistance 52 is connected across the current transformer secondary, preferably within the transformer case 22d for a reason to be explained, in order to permit varying the relationship between sensing means output voltage and total load current in the power distribution conductors 12, 14 and 16. The effect of changing the setting of variable resistance 52 is to alter the increment of total power, delivered through distribution conductors 12, 14 and 16, for which the control apparatus disconnects or reconnects one unit of dispensible load from or to the distribution conductors. That is, the smaller resistance 52 becomes, the greater the increase in total load current delivered through the power distribution conductors must be before another dispensible load unit will be disconnected from these conductors by energization of the control relay associated with such load unit. Conversely, if resistance 52 is increased in resistance value, then a correspondingly smaller increment of total load current increase will effect removal of an additional dispensible load from the system.

Another advantage resulting from the provision of variable resistance means across the transformer secondary at the location indicated is to permit the use of a standard type current transformer and low-voltage wiring between the transformer secondary and the control apparatus usually located remotely therefrom. It is well known that a current transformer is approved for inspected wiring installations only if provisions are made to prevent any possibility of dangerously high voltages developing across the output terminals of the current transformer due to a break in the circuit normally connected across these terminals. In the present arrangement the shunt resistance connected directly across the secondary of the current transformer within the transformer casing 22d may be made of such a value i. e. sufficiently low even in its maximum resistance setting, that should there be a break in the external circuit energized from the transformer secondary there can still be no excessive rise of output voltage to a value which would be regarded as high voltage according to the uniform wiring codes now in effect, so as to require special high-voltage wiring and insulation precautions. A typical range of values for resistance 52 would be 50 to 500 ohms.

In the design, adjustment and operation of the disclosed demand limit control apparatus, total load current drawn through distribution conductors 12, 14, and 16 is permitted to increase in the system until it reaches a value at which a further increase would result in a charge penalty established by the electric utility company in their rate schedule. At this point, during total load current increase, an output voltage is developed across sensing means terminals 26 and 28 which is sufficient to produce energization of the first control relay 32, thereby disconnecting the first or most dispensible load unit 20A from the power distribution conductors. Simultaneously therewith, the control relay 34 of the second most dispensible load, 20B, is connected across the output terminals 26 and 28 with its compensating resistance 46, and compensating resistance 44 is disconnected from such terminals. Should the reduction of total load current, effected by disconnecting dispensible load 20A, fail to reduce the total load current below the demand limit assigned to the system, relay 34 would immediately become energized and disconnect the dispensible load 20B also from the power distribution conductors. In like manner, the succeeding, or other less dispensible loads 20C and 20D would be successively disconnected from the power distribution conductors if the removal of their immediate predecessors in the order of priority, respectively, proved insufficient to reduce total load current to a value below the demand limit.

If, on the other hand, removal of the most dispensible load 20A proved sufficient to drop the total load current to a value below the demand limit, then either of two subsequent developments could occur. Either the total load current could continue to rise from its reduced value attending disconnection of dispensible load 20A, and eventually exceed the total demand limit whereupon the dispensible load 20B would be disconnected in addition to 20A, or the total load could drop until the sensing means output voltage appearing across terminals 26 and 28 reached the point at which relay 32 becomes deenergized. Thereupon dispensible load 20A would be reconnected to the power distribution conductors. Obviously, the resulting increase of total load current effected by this reconnection of a dispensible load to the power distribution conductors must be less than the difference between the upper and lower values of total load current corresponding to the difference between energizing and deenergizing voltages of relay 32; otherwise, an instability or oscillating condition would develop, wherein dispensible load 20A would be connected and disconnected repeatedly when other load conditions remained constant. The same considerations apply to the remaining dispensible loads and the difference between the energizing and deenergizing voltages of their respective control relays. In general, if similar control relays are employed as is normally and preferably the case, it is desirable to select the dispensible loads so that they have approximately the same current requirements, and so that the largest current requirement of any such dispensible load is still slightly less than the difference between total load current delivered through the distribution conductors to produce a change in control voltage across terminals 26 and 28 from relay-energizing voltage to relay-deenergizing voltage. It is this difference that may be regulated by varying the value of resistance 52 in order to adapt the system to operate in different installations wherein the respective load capacity ratings of the largest dispensible loads differ materially. In all cases, however, and for all adjustments of the resistance 52, the provision of compensating resistance action accompanying the successive priority switching action of the control relays provides reliable and predictably accurate and consistent load demand limit operation.

It will be evident that the foregoing description and accompanying illustration are primarily by way of example only and that the number and type of relay means in different installations, and for broad purposes, the type of total load current sensing means may vary within the scope of the novel principles involved.

I claim as my invention:

1. In an electric power distribution system comprising a plurality of electrical loads at least some of which are dispensible in their operation and differ in their relative degree of dispensibility, and electrical power conductors for delivering load current to said loads, peak total load demand control apparatus comprising, in combination, means for sensing total load current drawn by said loads, said sensing means having an output delivering a voltage which increases and decreases with increase and decrease of such total load current, a plurality of load disconnect switch means normally connecting the different dispensible loads respectively to the power conductors, a plurality of voltage-sensitive switch-actuating devices energizable for actuating the respective switch means to disconnect said dispensible loads from such power conductors in response to energizing voltage above an upper value corresponding to voltage produced by said sensing means at a predetermined upper value of total load current, and deenergizable for deactuating such switch means to reconnect said dispensible loads thereto in response to a reduction of such energizing voltage below a lower value corresponding to voltage produced by said sensing means at a predetermined lower value of total load current, means continuously connecting to said sensing means output the switch-actuating device of the most dispensible of said loads, additional switch means actuatable for connecting to said output the respective switch-actuating devices of other dispensible loads, the additional switch means for such other dispensible loads being individually actuatable during switch-actuating energization of the switch-actuating devices for the next more dispensible loads, respectively, and impedance compensating means controlled by said switch-actuating devices for maintaining a substantially constant load impedance across the output of said voltage sensing means throughout variations in the number of switch-actuating devices instantaneously connected thereto.

2. The control apparatus defined in claim 1, wherein the impedance compensating means comprises a plurality of resistance elements of successively higher resistance values respectively associated with individual dispensible loads in order of decreasing dispensibility thereof, and further switch means actuatable by energization of the respective switch-actuating devices, each such further switch means being arranged, upon actuation thereof, to connect across the sensing means output the resistance element associated with the next most dispensible load and substantially simultaneously disconnect therefrom the resistance element associated with its own load.

3. The control apparatus defined in claim 1, wherein the load current sensing means comprises a current transformer having an output circuit, and a shunt impedance means connected across the sensing means output circuit of an impedance value preventing development of high voltage across said output in the event of a break in the connections to the switch-actuating devices.

4. The control apparatus defined in claim 3, wherein the latter impedance means is variable to permit varying the difference between the upper and lower values of voltage produced across the current transformer output circuit for the same upper and lower values of total load current.

5. Apparatus for controlling the electrical load demand limit of a premises having a plurality of electrical loads of which at least some are temporarily dispensible loads having an order of relative dispensibility, said apparatus comprising, in combination, means for sensing total load current and for producing output voltage which rises and falls with such total load current, a plurality of relays associated with respectively different dispensible loads, each having a normally closed first set of contacts adapted for interrupting the energizing circuit of the dispensible load associated with the relay by opening of said contacts, a normally closed second set of contacts, a normally open third set of contacts, and being energizable to actuate said sets of contacts in response to energizing voltage applied thereto above a predetermined upper value corresponding to said output voltage at a preselected peak load demand limit for total load current, and being deenergizable to actuate said sets of contacts reversely to their normal positions in response to energizing output dropping below a predetermined lower value corresponding to a lower limit of total load current, means continuously connecting the relay of the most dispensible load across the output of said sensing means, individual compensating resistance elements associated with the respective relays, means connecting the resistance element of the most dispensible load relay across the output of said sensing means through the normally closed second set of contacts of such relay, and means including the normally open third set of contacts of the respective relays adapted by energization of such relays respectively for connecting the resistance elements of the respective next less dispensible load relays across said sensing means output through the normally closed second set of contacts of the respective latter relay, said resistance elements individually having different resistance values compensating for changes of electrical resistance of said relays across said sensing means output caused by variations in the number of such relays connected thereacross, whereby the net total resistance across said sensing means output is maintained substantially constant.

6. The apparatus defined in claim 5, and resistance means connected across the output of the sensing means, said resistance means being variable, thereby to vary the difference between the upper and lower limits of total load current producing the predetermined upper and lower values of sensing means output voltage.

7. In combination, a source of control voltage subject to variation throughout a range extending upwardly above a predetermined upper value and downwardly below a predetermined lower value, a plurality of relay means arranged in predetermined order of priority for actuation thereof, said relay means being individually energizable at applied voltage exceeding said upper value and deenergizable at applied voltage dropping below said lower value, normally open switch means actuated by the respective relay means, means connecting said relay means of highest priority continuously across said voltage source, circuit means for connecting the remaining relay means in parallel successively and cumulatively in order of their relative priority across said voltage source, said circuit means including connections between said source and each such remaining relay means through the normally open switch means of the relay means of relatively higher priority, a plurality of electrical impedance means associated with the respective relay means, each such impedance means having an impedance value such that when connected in parallel across said source with its associated relay means and the relay means of higher priority the resulting total net impedance thereof across said source is substantially equal to that of each of the other impedance means connected across said source with its associated relay means and the relay means of higher priority, and a plurality of normally closed switch means individual to the respective relay means, normally connecting the impedance means across the associated relay means, respectively, said normally closed switch means being actuatable by energization of the respective relay means.

8. In combination, a plurality of electrical loads at least two of which are temporarily dispensible loads having predetermined order of dispensibility, power supply means for said electrical loads, current transformer means sensing total load current delivered by said power supply means to all of said electrical loads, said current transformer means producing an output voltage which rises and falls with increase and decrease of total load current, a first relay means connected across the output of said current transformer means, said first relay means having a first normally closed set of contacts connecting the most dispensible load to said power supply means, said first relay means being energizable to disconnect said most dispensible load from said power supply means in response to said output voltage rising above a predetermined upper value and being deenergizable to reconnect said most dispensible load to said power supply means in response to said output voltage dropping below a predetermined lower value, a first electrical resistance element, said first relay means having a second set of normally closed contacts connecting such resistance element in parallel with such first relay means, a second relay means, said first relay means having a set of normally open contacts closable by energization of such relay means to connect said second relay means across said current transformer output, said second relay means having a first set of normally closed contacts normally connecting the second most dispensible load to said power supply means, said second relay means being energizable to disconnect said latter load from said power supply means in response to said output voltage rising above substantially said upper value and being deenergizable to reconnect said latter load to said power supply means in response to such output voltage dropping below a predetermined lower value, and a second resistance element, said second relay means having a second set of normally closed contacts connecting said second resistance element in parallel with said second relay means, said first and second resistance elements having respective resistance values such that the combined parallel resistance value of the first relay means and first resistance element in parallel substantially equals the combined resistance value of the first and second relay means and second resistance element all in parallel.

9. In combination, a plurality of electrical loads at least two of which are temporarily dispensible loads having predetermined order of dispensibility, power supply means for said electrical loads, current transformer means sensing total load current delivered by said power supply means to all of said electrical loads, said current transformer means producing an output voltage which rises and falls with increase and decrease of total load current, a first relay means connected across the output of said current transformer means, said first relay means having a first normally closed set of contacts connecting the most dispensible load to said power supply means, said first relay means being energizable to disconnect said most dispensible load from said power supply means in response to said output voltage rising above a predetermined upper value and being deenergizable to reconnect said most dispensible load to said power supply means in response to said output voltage dropping below a predetermined lower value, a first electrical resistance element, said first relay means having a second set of normally closed contacts connecting such resistance element in parallel with such first relay means, and a second relay means, said first relay means having a set of normally open contacts closable by energization of such relay means to connect said second relay means across said current transformer output, said second relay means having a set of normally closed contacts normally connecting the most dispensible load to said power supply means, said second relay means being energizable to disconnect said latter load from said power supply means in response to said output voltage rising above substantially said upper value and being deenergizable to reconnect said latter load to said power supply means in response to such output voltage dropping below a predetermined lower value, said relays and said first resistance element having respective resistance values such that the combined parallel resistance value of the first relay means and first resistance element in parallel substantially equals the combined resistance value of the first and second relay means in parallel.

No references cited.